US006553491B1

(12) United States Patent
Dover

(10) Patent No.: US 6,553,491 B1
(45) Date of Patent: Apr. 22, 2003

(54) CONFIGURING DEVICES IN A COMPUTER SYSTEM

(75) Inventor: Lance Dover, Fair Oaks, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/474,647

(22) Filed: Dec. 29, 1999

(51) Int. Cl.[7] .................................................. G06F 9/44

(52) U.S. Cl. ....................................................... 713/100

(58) Field of Search ................................... 713/1, 100

(56) References Cited

U.S. PATENT DOCUMENTS

| 6,028,445 A | * | 2/2000 | Lawman | 326/38 |
| 6,085,317 A | * | 7/2000 | Smith | 713/1 |
| 6,282,640 B1 | * | 8/2001 | Klein | 713/1 |
| 6,430,687 B1 | * | 8/2002 | Aguilar et al. | 713/2 |

* cited by examiner

Primary Examiner—Thomas M. Heckler
(74) Attorney, Agent, or Firm—Fish & Richardson P.C.

(57) ABSTRACT

Computer system information prompting a reconfiguration of a target device that is part of the system is received, and in response to the information, the target device is reconfigured using configuration data for the target device that has been stored in non-volatile memory of a second self-configuring device that is part of the system.

29 Claims, 3 Drawing Sheets

CONFIGURING DEVICES IN A COMPUTER SYSTEM

TECHNICAL FIELD

This invention relates to configuring devices in a computer system.

BACKGROUND

Special purpose integrated circuit chips, for example, typically cannot perform their normal functions until they are configured, which is usually done when the computer system is powered up or reset. Configuration information is usually stored on the device itself in non-volatile memory. For so-called programmable logic devices (PLD's) and field programmable gate arrays (FPGA's), the configuration information may be stored in a non-volatile memory located off the device. By changing the configuration information, the functions of the PLD's and FPGA's may be changed.

In some computer systems, the chips that need to be configured are part of a chipset and a local channel is provided to enable communication between the chips in a way that does not directly use and is not disruptive of the operation of the main system bus. The local channel can be called a local bus.

Typically the chips within the computer system must be customized to particular tasks, that is, configured to function as desired. One expensive way to configure a chip is to alter the chip hardware during construction, using, for example, bond pads or pin straps.

In another approach, the configuration is done based on data sent to the chip (for example, a PLD or an FPGA) on the system bus, e.g., during a reset cycle. This approach has the advantage that the chip may be customized to a particular application without hardwiring. In so-called "self-configuring" chips, the configuration instructions are kept in the chip's own non-volatile memory or non-volatile storage (NVS). Non-volatile storage is able to retain data in the absence of main power. There are many kinds of non-volatile memory, such as read-only memory (ROM), programmable read-only memory (PROM) and erasable programmable read-only memory (EPROM). Some types of battery-backed random-access memory (RAM) also may be considered to be non-volatile.

If a chip is not self-configuring, it receives its configuration instructions over a communications channel or bus from an external source. Configuration activity occurring on the bus may be referred to as the "configuration bus cycle."

SUMMARY

In general, in one aspect, the invention features storing configuration data for a target device in non-volatile memory of a second self-configuring device. The target device and the second self-configuring device are a part of a computer system. The invention further features receiving computer system information prompting a reconfiguration of the target device, and in response to the information, reconfiguring the target device using the configuration data.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the, various drawings indicate like elements.

DETAILED DESCRIPTION

Some implementations of the invention include groups of chips in a chipset, where at least one chip in the chipset has some form of non-volatile storage. In response to a reset signal, the chip with NVS configures itself and also supplies the configuration data to configure other chips in the chipset using a configuration bus cycle. The self-configuring chip may configure multiple chips in a chipset directly. The self-configuring chip may also configure another chip, which in turn may provide configuration data to another chip in the chipset. The configuration data are provided on a local bus, making the configuration process invisible to the system and the user.

Figure 1:
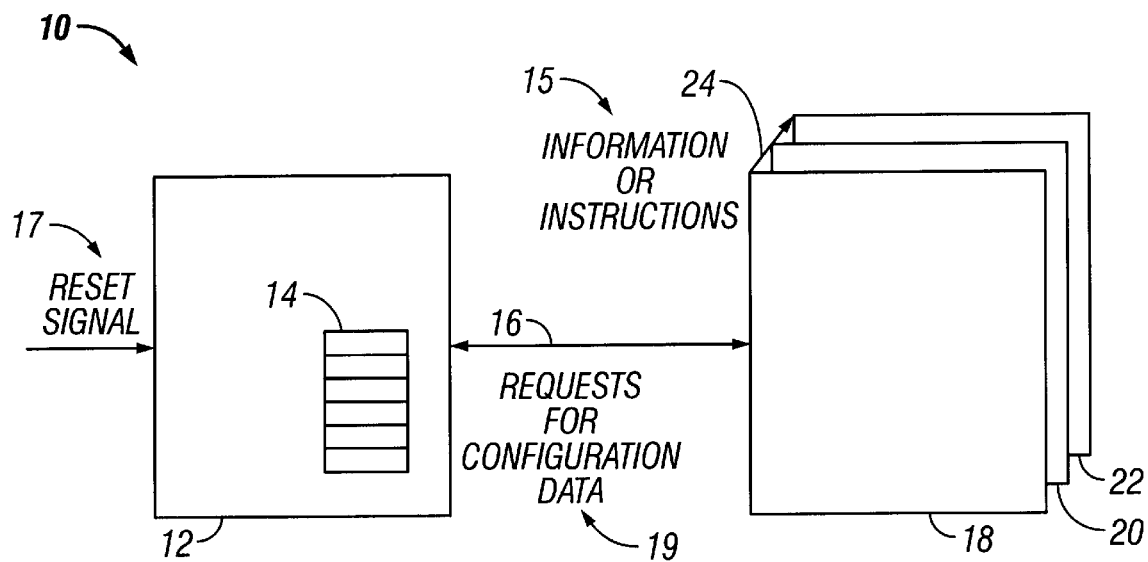
FIG. 1 is a block diagram of an implementation of the invention.

In one implementation, shown in FIG. 1, integrated circuit chips 12, 18, 20, 22 form part of a chipset 10. One chip 12 in the chipset has non-volatile storage 14, making it an NVS device. The NVS device 12 includes within its non-volatile memory 14 information or instructions 15 for configuring the NVS device 12 and other non-NVS devices 18, 20, 22 in the chipset 10. The information or instructions 15 within non-volatile memory 14 include configuration data for the chipset 10.

After receiving a reset signal 17 from the computer system (not shown), the NVS device 12 places configuration data on a local bus 16 connecting the NVS device 12 with the non-NVS devices 18, 20, 22 in the chipset 10. The NVS device 12 may also place configuration data on local bus 16 in response to requests for configuration data 19 placed upon the bus by the non-NVS devices 18, 20, 22. Configuration data may be sent by the NVS device 12 on local bus 16 directly to each non-NVS device 18, 20, 22 in turn. Or, configuration data may be sent by the NVS device 12 on local bus 16 to one of the non-NVS devices 18, which may in turn pass along configuration data to other non-NVS devices 20, 22 on a bus 24. Bus 24 may be the same communication channel as bus 16.

Figure 2:
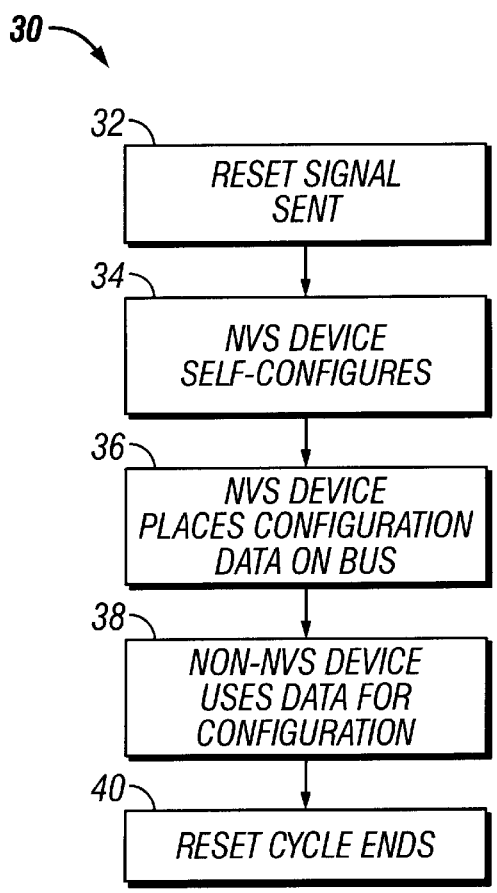
FIG. 2 is a flowchart showing steps in various implementations of the invention.

FIG. 2 shows a flowchart for a configuration bus cycle 30. The cycle begins when a reset signal is sent (32), e.g., in response to a system power-up or as commanded by a user (many of my comments, such as the ones in this sentence, are stylistic). In response to the reset signal, the NVS device uses the configuration data stored within its non-volatile memory to self-configure 34. The NVS device then places configuration data stored within its non-volatile memory on the bus 36, and a non-NVS device uses this data for configuration 38. Configuration of all devices is completed before the end of the reset cycle 40.

Figure 3:
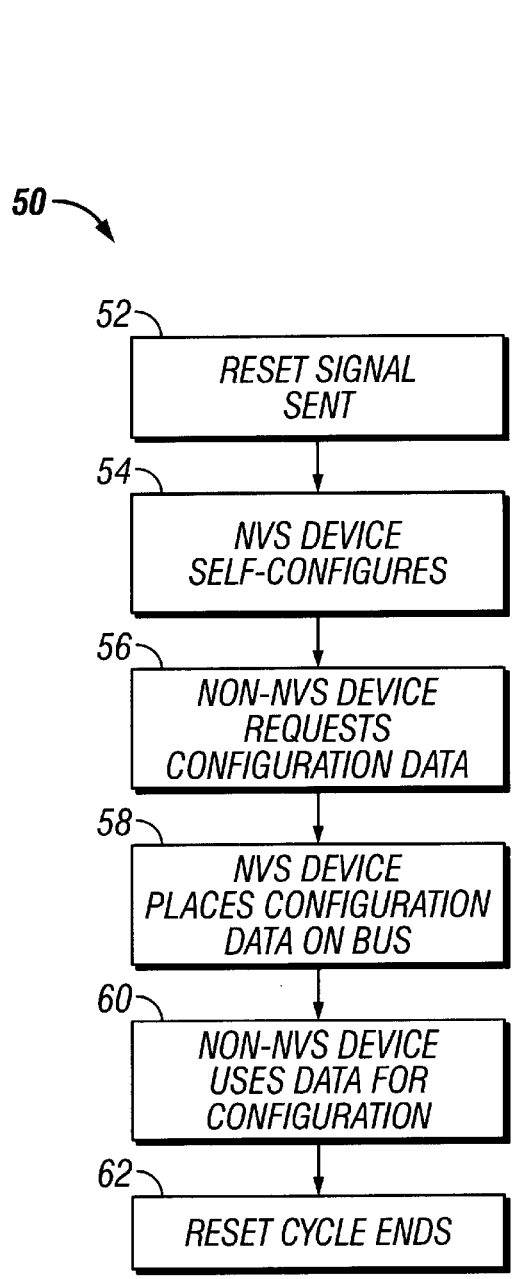
FIG. 3 is flowchart showing steps in various implementations of the invention.

FIG. 3 shows a flowchart for another kind of configuration bus cycle 50. Steps 52 and 54 are like steps 32 and 34 of FIG. 2. Unlike FIG. 2, in response to the reset signal, here it is the non-NVS device that places (56) a request for configuration data on the bus. The NVS device responds by placing the configuration data on the bus (58), which the non-NVS device uses-for configuration (60). Configuration of all devices is completed before the end of the reset cycle (62).

Figure 4:
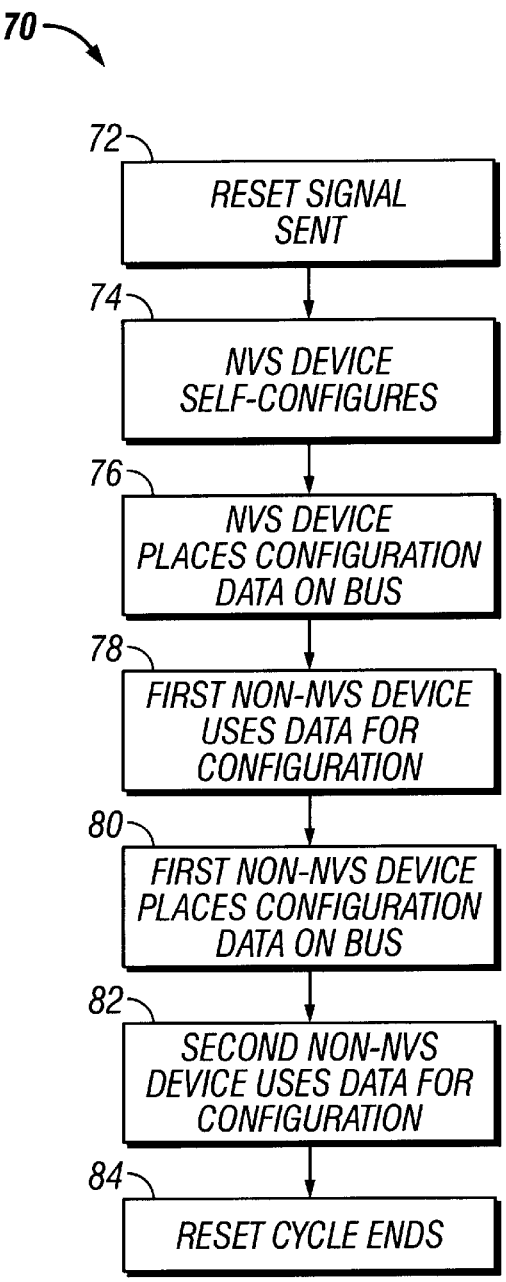
FIG. 4 is a flowchart showing steps in various implementations of the invention.

In another kind of configuration bus cycle, shown in FIG. 4, steps 72 and 74 are again like steps 32 and 34 of FIG. 2. Step 76 is also like step 36 of FIG. 2. In the implementation of FIG. 4, however, the first non-NVS device uses the data for configuration 78. Then, the first non-NVS device places configuration data on the bus 80. A second non-NVS device uses this data for configuration 82. Configuration of all devices is completed before the end of the reset cycle 84.

Figure 5:
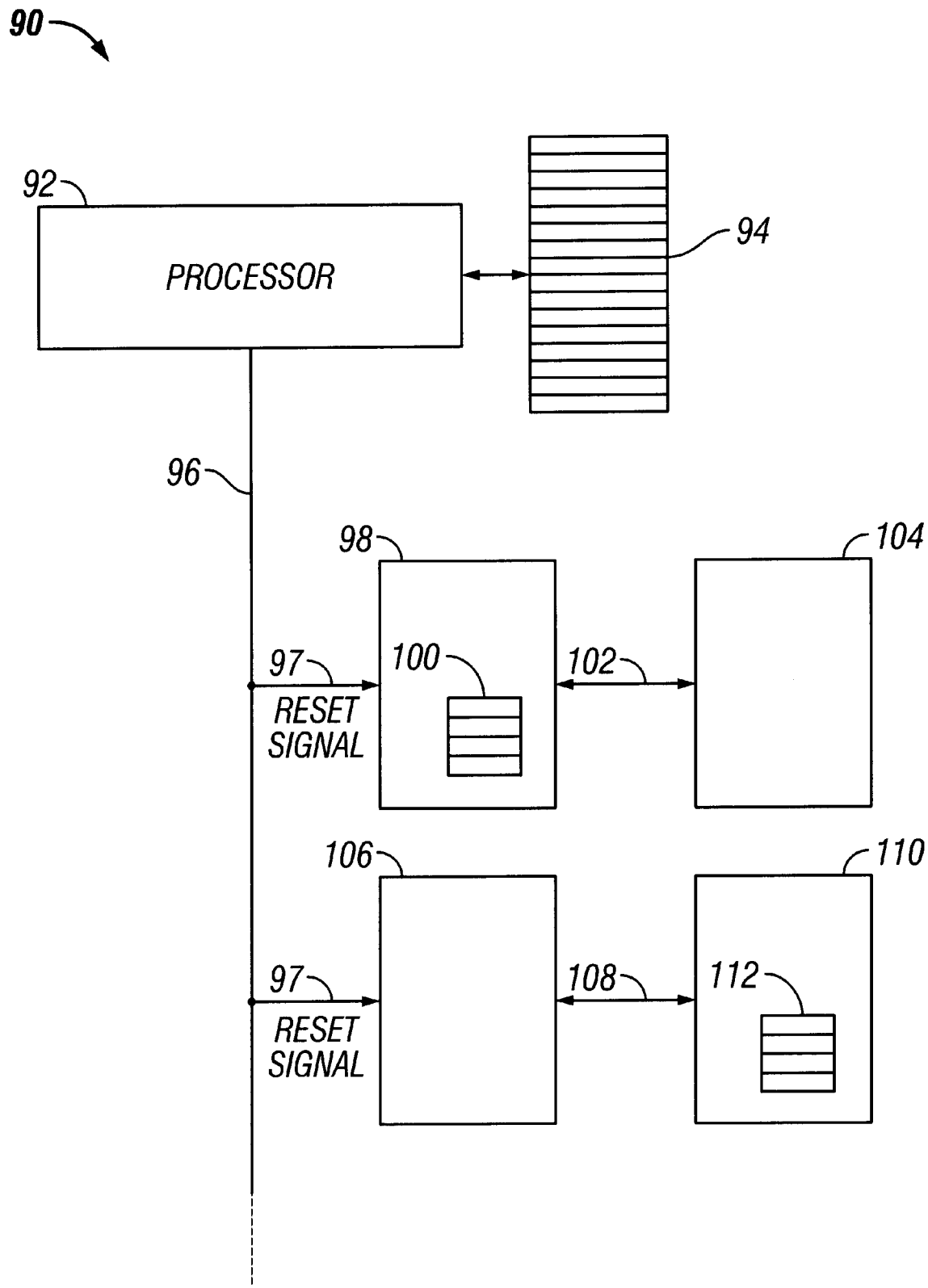
FIG. 5 a block diagram of an implementation of the invention.

FIG. 5 shows the invention implemented within a computer system 90. The system has central processor 92, which is served by memory 94. A communication channel or main system bus 96 connects the processor to other devices 98, 106 in the system. One of the devices 98 is an NVS device with non-volatile memory 100, like chip 12 with non-volatile memory 14 in FIG. 1. NVS device 98 is connected to non-NVS device 104 by a local bus 102, like non-NVS device 18 is connected to NVS device 12 by a local bus 16 in FIG. 1. Communication along local bus 102 is non-system-level communication. After receiving a reset signal 97 from the processor 92, the NVS device 98 places configuration data on a local bus 102. FIG. 5 also shows a non-NVS device 106 receiving the reset signal 97 from the system bus 96. The non-NVS device 106 may request configuration information from a device 110 with non-volatile storage 112. The devices 106 and 110 communicate on a local bus 108.

Other embodiments are within the scope of the following claims.

What is claimed is:

1. A method comprising
   storing configuration data for a target device that is part of a computer system in non-volatile memory of a second self-configuring device that is also part of the computer system,
   receiving computer system information prompting a reconfiguration of a target device, and
   in response to the information, reconfiguring the target device using the configuration data.

2. The method of claim 1 further comprising communicating the configuration data from the second device to the target device using a local bus between the devices.

3. The method of claim 1 in which the prompting comprises signaling a power up or process of the system.

4. The method of claim 1 in which the communicating occurs during a power up or reset process of the system.

5. The method of claim 4 in which the communicating is done before the power up or reset process finishes.

6. The method of claim 5, in which the configuring is invisible to the system user.

7. The method of claim 1 in which the communicating is initiated by the target device.

8. The method of claim 1 in which the communicating is initiated by the second device.

9. The method of claim 1 in which the target device has no non-volatile memory.

10. The method of claim 1 in which additional target devices are configured based on configuration data stored in the second device.

11. A medium storing machine-readable software capable of configuring a machine to perform the following steps:
    storing configuration data for a target device that is part of a computer system in non-volatile memory of a second self-configuring device that is also part of the computer system,
    receiving computer system information prompting a reconfiguration of a target device, and
    in response to the information, reconfiguring the target device using the configuration data.

12. A method comprising
    receiving, at a target device that is part of a computer system, computer system information prompting a reconfiguration of the target device, and
    at the target device, requesting configuration information from a second device using a local communication channel connecting the devices.

13. The method of claim 12 in which the second device stores configuration information within non-volatile memory.

14. The method of claim 12 in which the target device requests configuration information in response to signals from the second device.

15. A method comprising
    receiving, at a first device that is part of a computer system, computer system information prompting a reconfiguration of a target device that is part of the computer system, and
    the first device initiating the sending of configuration information associated with the target device to the target device using a local communication channel.

16. The method of claim 15 in which configuration information is stored within non-volatile memory of the first device.

17. The method of claim 15 in which configuration information is communicated from one target device to an additional target device.

18. The method of claim 15 in which the first device sends configuration information in response to signals from the target device.

19. The method of claim 15 in which the communicating or configuring is invisible to the system user.

20. The method of claim 15 in which the target device has no non-volatile memory.

21. An apparatus comprising
    a configurable computer system device having a port for connection to a communication channel, the communication channel permitting non-system-level communication by the configurable.computer system device, and
    a mechanism that enables the configurable computer system device to be reconfigured using information carried on the communication channel, while the configurable computer system device is connected to a computer system that is undergoing a reset or power up process.

22. The apparatus of claim 21 in which the configurable device has no non-volatile memory.

23. The apparatus of claim 21 in which information carried on the communication channel is originated within the non-volatile memory of a second device connected to the channel.

24. The apparatus of claim 21 wherein the configurable device, is not self-configurable.

25. A computer system-comprising
    a central processor,
    a memory serving the central processor,
    a system-bus,
    a configurable computer system device having a port for connection to a communication channel that permits non-system-level communication by the device, and
    a mechanism that enables the configurable device to be reconfigured using information carried on the communication channel, while the configurable device is connected to the computer system and the computer system is undergoing a reset or power up process.

26. The system of claim 25, further comprising a second device with non-volatile memory connected to the channel, the configuration information being stored within the non-volatile memory of the second device.

27. A method for use in a system that includes:

a first device with non-volatile memory, a second device lacking non-volatile memory, capable of being configured by configuration data, a communication channel between the first device and the second device, the method comprising:

in response to a reset signal, sending configuration data along the communication channel.

28. The method of claim 27, the method further comprising the first device sending a request for configuration data along the communication channel.

29. The method of claim 27, the method further comprising sending configuration data to additional configurable devices attached to the channel.

* * * * *